(12) United States Patent
Dräger et al.

(10) Patent No.: US 9,632,495 B2
(45) Date of Patent: Apr. 25, 2017

(54) METHOD FOR SETTING UP AND/OR UPDATING THE PROGRAMMING OF A CONTROL UNIT OF A TRANSPORTATION DEVICE

(71) Applicant: VOLKSWAGEN AKTIENGESELLSCHAFT, Wolfsburg (DE)

(72) Inventors: Mark Dräger, Helmstedt (DE); Luc Patemoster, Lehre (DE); Michael John, Lostau (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/770,791

(22) PCT Filed: Jan. 13, 2014

(86) PCT No.: PCT/EP2014/050492
§ 371 (c)(1),
(2) Date: Aug. 26, 2015

(87) PCT Pub. No.: WO2014/131538
PCT Pub. Date: Sep. 4, 2014

(65) Prior Publication Data
US 2016/0018808 A1 Jan. 21, 2016

(30) Foreign Application Priority Data
Feb. 27, 2013 (DE) .................. 10 2013 003 271

(51) Int. Cl.
*G05B 19/042* (2006.01)
*B60R 16/023* (2006.01)
*H04L 12/40* (2006.01)

(52) U.S. Cl.
CPC ...... *G05B 19/0426* (2013.01); *B60R 16/0231* (2013.01); *G05B 2219/23294* (2013.01);
(Continued)

(58) Field of Classification Search
CPC ...... G05B 19/0426; G05B 2219/23313; G05B 2219/23294; B60R 16/0231; H04L 2012/40273
(Continued)

(56) References Cited

U.S. PATENT DOCUMENTS 5,521,588 A    5/1996   Kühner et al.
6,728,618 B2   4/2004   Heckmann et al.
(Continued)

FOREIGN PATENT DOCUMENTS

DE    43 15 494 C1    9/1994
DE    101 52 508      5/2003
(Continued)

OTHER PUBLICATIONS

International Search Report, dated Apr. 7, 2014, issued in corresponding International Application No. PCT/EP2014/050492.
(Continued)

*Primary Examiner* — Brian P Sweeney
(74) *Attorney, Agent, or Firm* — Andrews Kurth Kenyon LLP

(57) ABSTRACT

A method for setting up and/or updating the programming of a second control unit of a transportation device includes operating a first control unit of the transportation device in a first functional scope for setting up and/or updating the programming of a second control unit of the transportation device, setting up or updating the programming of the second control unit by the first control unit, and setting up the first control unit for a second functional scope. A system by which the method of the invention may be implements is also described.

9 Claims, 3 Drawing Sheets

(52) U.S. Cl.
CPC ............... *G05B 2219/23313* (2013.01); *H04L 2012/40273* (2013.01)

(58) Field of Classification Search
USPC .......................................................... 701/99
See application file for complete search history.

(56) References Cited

U.S. PATENT DOCUMENTS

| | | | |
|---|---|---|---|
| 2003/0088353 A1* | 5/2003 | Heckmann | B60T 8/172 |
| | | | 701/48 |
| 2004/0024473 A1 | 2/2004 | Branz et al. | |
| 2009/0125192 A1 | 5/2009 | Schmid | |
| 2012/0245780 A1 | 9/2012 | Eisele et al. | |

FOREIGN PATENT DOCUMENTS

| | | | | |
|---|---|---|---|---|
| DE | 10152508 A1 * | 5/2003 | ............. | B60T 8/172 |
| DE | 102 19 832 A1 | 11/2003 | | |
| DE | 10 2007 059 438 A1 | 6/2009 | | |
| DE | 10 2009 046 860 A1 | 5/2011 | | |
| WO | 03/021192 A1 | 3/2003 | | |
| WO | 2012/015439 | 2/2012 | | |

OTHER PUBLICATIONS

C. Heinisch et al., "Telematics-Moderated Software Download into Automotive Control Units", URL: http://217.160.79.153/uploads/media/kfzelektronikheinischv7.0.pdf.

* cited by examiner

METHOD FOR SETTING UP AND/OR UPDATING THE PROGRAMMING OF A CONTROL UNIT OF A TRANSPORTATION DEVICE

FIELD OF THE INVENTION

The present invention relates to a method for setting up and/or updating the programming of a control unit of a transportation device; it also relates to such a control unit, to a transportation device having such a control unit, and to a system having such a control unit.

BACKGROUND OF THE INVENTION

Modern transportation device such as motor vehicles are equipped with an increasing number of electronic components, each being provided with a separate control unit. The control units must be programmed appropriately for each individual transportation device type, its equipment, and possibly also the other used components, and provided with data (e.g., software), i.e., set up or also populated. To do so, the individual control units have to be connected to a data source, such as an external diagnostic device, and the appropriate programming data must then be selected and imported. Furthermore, there are transportation device where all control units are connected via a shared communications bus, such as a CAN bus (Controller Area Network bus), which has a central interface, e.g., a CAN diagnosis terminal, in order to be able to communicate with external units. If the control units are set up via the interface and the communications bus, the required data must likewise be individually selected and transferred to the corresponding control units.

The first setup of the control units or the data input (programming) usually takes place during the production of the transportation device. Mobile computers are normally used for this purpose, which copy the required data to the individual control units of the transportation device, for instance directly via an OBD cable (on-board diagnosis). These programming data may exist on the mobile computer or be transmitted to it during the setup operation via a communications link. This may be done via cables or in a wireless manner, e.g., via WLAN.

It is disadvantageous here that the connection of the mobile computer to the interface of the transportation device or the communications link to the mobile computer must be maintained for the duration of the setup, until the setup has been completed; incomplete programming data must be input retroactively at a later date, which entails additional work and expense. The duration of the setup not only depends on the quantity of the programming data but also on the data transmission rates of the communications bus or the individual control units. However, these control units are configured for the data quantities of their regular operation and less so for the one-time initial setup procedure, which makes the setup last longer. The process of the setup may therefore interfere with the production sequences, for instance by the presence of the mobile computer and possibly its cable link, especially across multiple production steps. Moreover, wireless communication links may have only limited ranges and data rates within a production lane, for example. In addition, the more data have to be transmitted, i.e., the longer each setup takes and necessitates the presence of a mobile computer, the greater the number of required mobile computers. They not only have to be purchased, but serviced as well. As the complexity of the electronic components of the transportation device in the form of ever more complicated control units increases, the cost of the setup and thus the number of mobile computers rises as well. Increases in the electronics and their complexity and performance in the transportation device result in delays in the current methods for setting up the control units, or in higher costs in the production. Measures aimed at using more mobile computers, which are used for longer periods of time for setting up a product, or measures aimed at increasing the data transmission rates between the mobile computer and the transportation device in order to transfer more data in less time solve these problems only partly and have their limits as well.

DE 101 52 508 A1 relates to a method for activating a system having a time-controlled communications system for controlling or regulating operational sequences in a motor vehicle. For control units having the same structure and identical programming, such as the electromechanical brake (EMB), which has one control unit for each wheel, the part of the programming that is the same for all control units and is required for the time-controlled communication may be stored in a central memory and transmitted, i.e., copied, from there to a volatile memory of the individual control units via the time-controlled communications system when the system is activated. For a secure and reliable activation, the system is first switched on and any one of the identical control units is temporarily operated as the master control unit that coordinates the transmission of the particular required data that are identical for all control units from a central memory of one of the control units to all control units.

It is an object of the present invention to remedy the above-mentioned disadvantages. More specifically, a method for accelerating or simplifying the setup and/or updating of control units for a transportation device is to be provided. The control unit for a transportation device in particular may already be connected in the transportation device (in the sense of a "control unit of a transportation device").

SUMMARY

An example embodiment of the present invention relates to a method for setting up and/or updating the programming of a second control unit of a transportation device, in particular during the production process, the method having the following steps:

Operating a first control unit of the transportation device at a first functional scope for setting up and/or updating programming of a second control unit of the transportation device;

Setting up or updating programming of the second control unit by the first control unit; and Setting up the first control unit for a second functional scope.

Programming, for example, refers to software that carries out the operation of the individual control unit at least partially, e.g., responds to incoming information, generates outgoing information, accesses stored data, and generates and/or modifies such data; this software differs from data such as parameters, etc. that are read out, used and stored by software, for example, but are unable to execute any functions on their own. In other words, instructions or operating system sequences and the like are to be understood as programming, i.e., any type of software that is able to execute the functionalities. Accordingly, a setup is a (first-time) establishment of a functional scope of a control unit operated on the side of the software, and update is a modification of an existing functional scope operated on the side of the software. A functional scope encompasses all of the functionalities that are jointly able to be executed by the control unit. Two functional scopes thus differ from each other in that they are unable to be executed simultaneously, for instance because they would then be in competition for individual elements of the control unit, such as the processor, memory, and interfaces.

The first functional scope of the first control unit thus encompasses all of the functionalities that are necessary for implementing a software setup or software update of a second control unit or still further control units, whereas the second functional scope of the first control unit is actually no longer able to execute precisely these particular functionalities; instead, the first control unit is operated according to the second functional scope in the way it is provided for the regular operation of the transportation device, e.g., as a central gateway control unit or an engine control unit. In other words, the second functional scope encompasses vehicle functionalities.

An example embodiment of the present invention is based on the understanding that a control unit of a transportation device is able to be temporarily repurposed for or rededicated to the task of setting up or updating additional control units of the transportation device in order to assume the setup and/or updating of the connected control units and to then execute its actual function for the first time or anew, preferably for the first time. This makes it possible to dispense with additional external data sources such as data processing systems or data memories that carry out the setup or updating of the control units exclusively. Until now, external data processing systems of this type, such as OBD diagnostic devices or data memories, were externally connected to the transportation device for this purpose for the duration, e.g., the production or servicing of the transportation. As a result, the time period of the external connection can be reduced in that the external data source initially sets up and/or updates only one control unit and this particular control unit then takes over the setup or updating of additional control units of the transportation device; the external data processing systems or data memories could be removed again in the meantime and be used for the next transportation device, for example.

In an example embodiment of the present invention, on the one hand, all data required for the setup and/or update could first be transmitted in their entirety to the first control unit, whereupon the communications link to the external data source can be severed and/or the setup and update of the second control unit and all further affected control units may then be undertaken by the first control unit. On the other hand, in parallel with the data transmission from the external data source to the first control unit, the first control unit, on its own, may also already begin with the setup and/or update of the second control unit and possibly of additional control units, and continue this activity once the communications link to the external control unit has been severed. In both cases, the first control unit may also receive the required data (e.g., in the form of software packets) from the external data source in order to reprogram or rededicate itself to its actual functional scope, e.g., as gateway or engine control unit, once it has completed its task of setting up and/or updating additional control units. However, it is also possible to hold the software code for the second (actual) functional scope in readiness in the first control unit, ready at an instant in which it is set up for the first functional scope or is executing this first functional scope. According to an example embodiment of the present invention, the "setup" of the first control unit can therefore also simply consist of activating appropriate software code for the second functional scope by making it executable, i.e., loading it into a working memory or a similar device, for example. This makes it possible to end the executability of the first functional scope.

According to an example embodiment of the present invention, the method may include:
  Setting up or updating programming of the first control unit with the aid of an external data processing system or an external data memory.

Such an external data processing system, for example, may be an OBD diagnostic device as used in the production or servicing of transportation device. A data memory can be a flash memory, for instance, as long as software that is required for the setup and/or update can be stored therein. Both devices may be connected to the first control unit either directly or also indirectly, for instance via a communications bus such as a CAN bus of the transportation device. A communications link between the external data processing system or the external data memory may be established by a direct link, e.g., the plug-in into an interface or a control unit of the transportation device, as well as indirectly in a cable-bound or wireless manner. The external data source may also be connected to the first control unit via a CAN bus of the transportation device, for example. It is advantageous to utilize such external data sources for setting up or updating a first control unit because they are already used in the production for the setup and/or updating of all control units.

According to an example embodiment of the present invention, the method may include:
  Severing a communications link between the external data processing system or the external data memory and the first control unit before the setup or updating of the programming of the second control unit by the first control unit has been started or completed.

It is consistent with an example embodiment of the present invention to reduce the duration of the communications connection between control units and an external data source, so that the external data source may rapidly be used again for other purposes. According to this example embodiment of the present invention, the software that is required for the setup and/or update of the second control unit is transmitted from the external data source to the first control unit in such a way that the communications link to the external data source may be severed even before the setup and/or the update of the second control unit by the first control unit has started or has been concluded. The external data source need not remain connected to the transportation device for executing the setup or the updating. In other words, the setup or update of the second control unit by the first control unit is still ongoing or has not even begun yet when the communications connection is severed, so that the external data source may be used for other purposes. This accelerates the setup or update procedure.

According to an example embodiment of the present invention, the method may include:
  Detection of the second control unit as a control unit to be set up or updated, by the first control unit.

The first control unit may be set up at an early stage during the assembly process for the purpose of setting up and/or updating additional control units. As soon as another control unit is connected in the transportation device, this is detected by the first control unit and the further control unit may be set up and/or updated. An external data source may thus be connected to the first control unit early in the production process, and enable the first control unit to set up all further control units as well as itself. The first control unit may then set up all further control units in succession as soon as they are connected and, at the end, it may set itself up for its actual (final) functional scope. In this way the external data source may be connected to the first control unit only at the start of production. Also, as previously described, the first control unit may already be set up prior to being assembled and connected in the transportation device. The control unit may also be connected to a possibly stationary external data source, and once its setup has been completed, be transported to the transportation device that is being assembled. The setup of the first control unit also may take place at the manufacturer of the control unit or in the control unit factory, and the installation of the first control unit be carried out at the manufacturer of the transportation device or at the factory of the transportation device.

According to an example embodiment of the present invention, the method may include:

Operating the second control unit within a first functional scope for setting up and/or updating programming of a third control unit of the transportation device;

Setting up or updating programming of the third control unit by the second control unit; and Setting up the second control unit for a second functional scope.

An example embodiment of the present invention may be transferred to the setup and the rededication of additional control units of the transportation device in that the second control unit initially is used for setting up a further control unit or a plurality of further control units as well, and is then set up for, or rededicated to, its actual functional scope, e.g., either by itself or by the first control unit. This makes it possible to further accelerate the setup processes within the control unit interconnection inside the transportation device.

According to an example embodiment of the present invention, a control unit for a transportation device, in a first functional scope, is configured for setting up or updating the programming of at least one second control unit of the transportation device.

The first control unit may be connected to the second control unit via a communications bus and may have an interface for establishing a communications link to an external data processing system or an external data memory, the interface having a higher data transmission rate than the communications bus. Such a communications bus, for instance, may be a CAN bus as used in transportation device for the communication between control units and further components. It may be configured for a data transmission rate as required or sufficient for the regular operation of the transportation device. However, in order to be able to execute the process of the (initial) setup and/or update of the control units as rapidly as possible, a higher data transmission rate may be required between the external data processing system or the external data memory and the first control unit. It is therefore advantageous to provide a direct interface that has a higher data transmission rate than the CAN bus on the first control unit for this purpose, so that the data required for the setup and/or update of all control units can be transmitted to the first control unit as quickly as possible and the external data processing system or the external data memory can then be removed again, the setup and/or the update of the further control units via the CAN bus taking place only thereafter or being ongoing then. The lower data transmission rate of the CAN bus exerts no adverse influence on the method.

In an example embodiment of the present invention, the control unit is a gateway control unit or an engine control unit, and/or the first control unit has a memory or is connected to an internal memory for storing data for the setup up and/or updating of additional control units transmitted to the first control unit from the external data processing system or the external data memory. Using a gateway control unit or an engine control unit as the first control unit is advantageous inasmuch as these control units are very high-capacity units in terms of their computational performance. In addition, these control unit are installed in the transportation device at a very early stage. Using a memory inside the transportation device is advantageous because it allows the data required for setting up and/or updating all control units to be held in readiness in the transportation device and the external data source to be removed again even before the utilization of these data for setting up and/or updating has been concluded within the transportation device.

According to an example embodiment of the present invention, a transportation device, in particular a vehicle, may be equipped with a control unit as described herein.

According to an example embodiment of the present invention, a system has a control unit for a transportation device as previously described, an external data processing system or an external data memory, and a communications bus of the transportation device that interconnects the control unit and the external data processing system or the external data memory to each other. An example embodiment of the present invention also encompasses the direct connection of the external data processing system or the external data memory to the CAN bus as a further bus station, e.g., via an adapter in the form of a CAN controller, in order to be able to participate in the CAN bus automatically and to make its data available to the first control unit, which then is able to carry out the setup and/or update of additional control units as soon as these control units are detected at the CAN bus as control units to be set up and/or updated. An interface to be provided on the first control unit for this purpose is unnecessary, because it is possible to connect a further station to the CAN bus, for instance via a CAN bus interface such as the CAN diagnostic terminal for a connection to an external diagnostic unit.

Further features and aspects of example embodiments of the present invention are explained in greater detail below with reference to the appended Figures.

DETAILED DESCRIPTION

Figure 1:
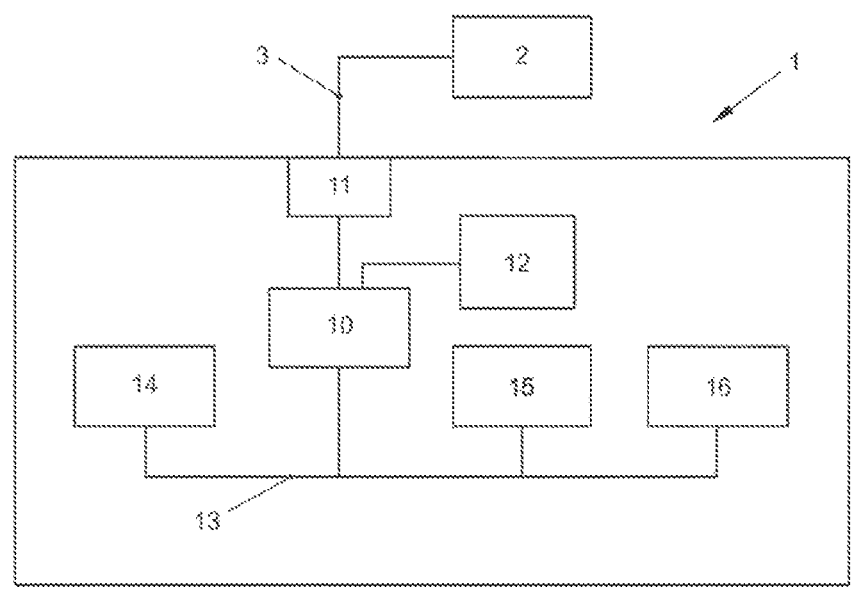
FIG. 1 shows a schematic illustration of a transportation device having a control unit architecture according to an example embodiment of the present invention.

FIG. 1 shows a schematic illustration of a transportation device 1 having a control unit architecture according to a first exemplary embodiment of the present invention. Transportation device 1 has a plurality of control units 10, 14, 15, 16, which are interconnected via a communications bus 13. A first control unit 10 is connected to a memory 12 for storing data, and to an interface 11, which is able to be connected via a communications link 3 to an external data source 2 such as an external data processing system or an external data memory. Communications link 3 has a higher data transmission rate than communications bus 13.

Figure 2:
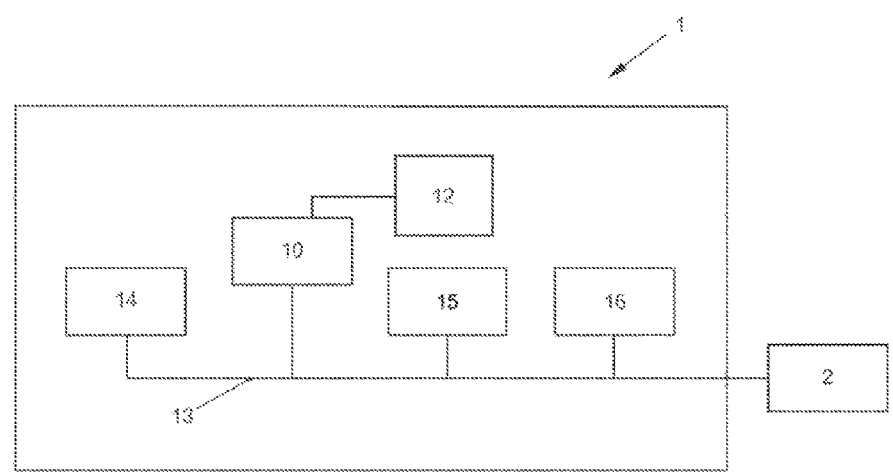
FIG. 2 shows a schematic illustration of a transportation device having a control unit architecture according to an example embodiment of the present invention.

FIG. 2 shows a schematic illustration of a transportation device 1 having a control unit architecture according to a second exemplary embodiment of the present invention. It differs from the architecture of the first exemplary embodiment only in that external data source 2 is connected directly to communications bus 13 as a further station, for instance by way of a bus interface that may be used for the connection of diagnostic units, for example. Interface 11 may be obsolete for this reason. Communications link 3 corresponds to the communications link via communications bus 13.

Figure 3:
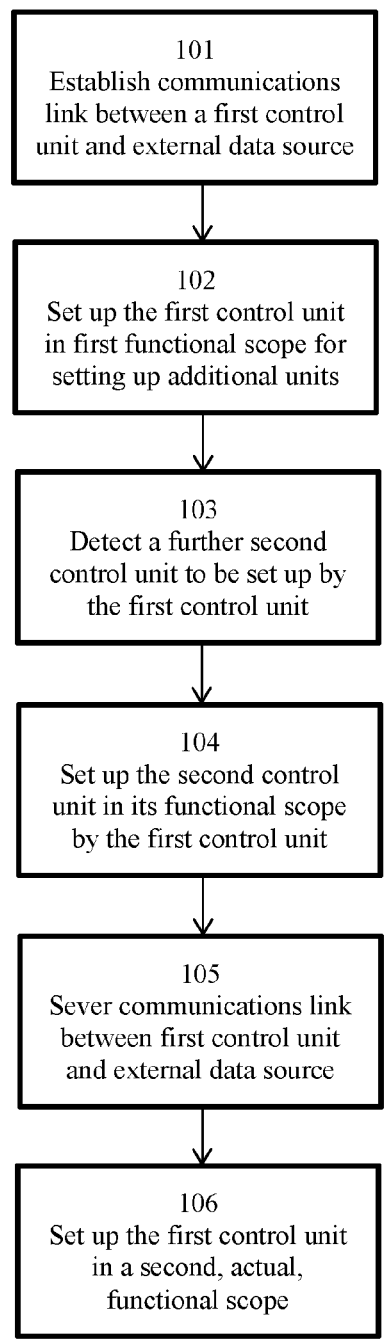
FIG. 3 shows a flow chart of a method according to an example embodiment of the present invention.

FIG. 3 shows a flow chart of a method according to an example embodiment of the present invention, which can be applied to both exemplary embodiments of the control unit architecture. In a first step 101, communications link 3 is established between external data source 2 and first control unit 10. In a second step 102, external data source 2 utilizes this communications link 3 for setting up first control unit 10 in a first functional scope in order to enable it to set up additional control units 14, 15, 16 in their respective functional scopes. If control unit 10 detects a further, second control unit 14 as a control unit 14 to be set up in a third step 103, then second control unit 14 will be set up in its functional scope by first control unit 10 in a fourth step 104. In a fifth step 105, communications link 3 to external data source 2 is severed again. This fifth step takes place in parallel with or prior to fourth step 104, so that the setup of second control unit 14 has not been started yet or has not been completed yet when communications link 3 is severed. According to an example embodiment of the present invention, this makes it possible to use external data source 2 for other purposes again while the setup of control units 14, 15, 16 is still ongoing. In a sixth step 106, first control unit 10 is finally set up in its second, actual functional scope after first control unit 10 is no longer required for setting up further control units 14, 15, 16. This may be done by control unit 10 itself or also by one of the other control units 14, 15, 16.

Although the aspects according to the present invention and advantageous specific embodiments have been described in detail with the aid of the exemplary embodiments explained in connection with the attached figures, modifications and combinations of features of the exemplary embodiments shown are possible for one skilled in the art, without leaving the scope of the present invention, whose range of protection is specified by the attached claims.

The invention claimed is:

1. A method for setting up and/or updating a functional software programming of a second control unit of a transportation device, the method comprising:
setting up a first control unit of the transportation device in a first functional scope for setting up and/or updating the functional software programming of a second control unit of the transportation device with the aid of an external data processing system or an external data memory;
setting up or updating the functional software programming of the second control unit by the first control unit; and
setting up the first control unit for a second functional scope.

2. The method of claim 1, further comprising:
severing a communications link between the external data processing system or the external data memory and the first control unit before the setup or updating of the functional software programming of the second control unit by the first control unit has been completed.

3. The method of claim 1, further comprising:
detecting the second control unit as the control unit to be set up or updated by the first control unit.

4. The method of claim 1, further comprising:
operating the second control unit in a first functional scope for setting up and/or updating the functional software programming of a third control unit of the transportation device; and
setting up or updating the functional software programming of the third control unit by the second control unit and setting up the second control unit for a second functional scope.

5. A system for a transportation device, comprising:
a control unit configured in a first functional scope for setting up or updating a functional software programming of at least one second control unit of the transportation device, and further configured for being set up for a second functional scope with the aid of alternative programming, wherein the first control unit has an interface for establishing a communications link to an external data processing system or an external data memory.

6. The control unit of claim 5, wherein the first control unit is able to be connected to the second control unit via a communications bus and the interface has a higher possible data transmission rate than the communications bus.

7. The control unit of claim 5, wherein the control unit is a gateway control unit or an engine control unit, and/or the first control unit has a memory or is connected to an internal memory for storing data for setting up and/or updating a functional software programming of further control units transmitted to the first control unit from the external data processing system or the external data memory.

8. A transportation device, comprising:
a control unit configured in a first functional scope for setting up or updating a functional software programming of at least one second control unit of the transportation device, and further configured for being set up for a second functional scope with the aid of alternative programming;
wherein the first control unit is able to be connected to the second control unit via a communications bus and has an interface for establishing a communications link to an external data processing system or an external data memory, the interface having a higher possible data transmission rate than the communications bus; and
wherein the control unit is a gateway control unit or an engine control unit, and/or the first control unit has a memory or is connected to an internal memory for storing data for setting up and/or updating a functional software programming of further control units transmitted to the first control unit from the external data processing system or the external data memory.

9. A system, comprising:
a control unit of a transportation device configured in a first functional scope for setting up or updating a functional software programming of at least one second control unit of the transportation device, and further configured for being set up for a second functional scope with the aid of alternative programming, the control unit having an external data processing system or an external data memory; and a communications bus of the transportation device, the communications bus connecting the control unit and the external data processing system or the external data memory to each other.

* * * * *